(12) United States Patent
Imai et al.

(10) Patent No.: US 12,529,755 B2
(45) Date of Patent: Jan. 20, 2026

(54) HOST VEHICLE POSITION ESTIMATION DEVICE AND HOST VEHICLE POSITION ESTIMATION METHOD

(71) Applicant: HITACHI ASTEMO, LTD., Hitachinaka (JP)

(72) Inventors: Masato Imai, Tokyo (JP); Satoru Okubo, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 223 days.

(21) Appl. No.: 18/559,880

(22) PCT Filed: Feb. 28, 2022

(86) PCT No.: PCT/JP2022/008222
§ 371 (c)(1),
(2) Date: Nov. 9, 2023

(87) PCT Pub. No.: WO2022/249610
PCT Pub. Date: Dec. 1, 2022

(65) Prior Publication Data
US 2025/0076448 A1 Mar. 6, 2025

(30) Foreign Application Priority Data
May 28, 2021 (JP) .................. 2021-090617

(51) Int. Cl.
*G01S 5/14* (2006.01)
*G01S 5/02* (2010.01)
(52) U.S. Cl.
CPC .............. *G01S 5/0284* (2013.01); *G01S 5/14* (2013.01)
(58) Field of Classification Search
CPC ................................. G01S 5/0284; G01S 5/14
(Continued)

(56) References Cited

U.S. PATENT DOCUMENTS 5,512,904 A 4/1996 Bennett
2025/0292425 A1* 9/2025 Sah ........................... G06T 7/70

FOREIGN PATENT DOCUMENTS

CA 2997046 A1 * 3/2017 ......... G01C 21/3602
CN 114270138 A * 4/2022 ............ H04W 4/029
(Continued)

OTHER PUBLICATIONS

International Search Report with English Translation and Written Opinion of International Patent Application No. PCT/JP2022/008222 dated May 17, 2022 (9 pages).

*Primary Examiner* — Harry K Liu
(74) *Attorney, Agent, or Firm* — Foley & Lardner LLP

(57) ABSTRACT

Provided are an own-vehicle position estimation device and an own-vehicle position estimation method which are capable of estimating the position of an own vehicle with high accuracy, including not only one-dimensional distances of movement but also two-dimensional directions of cornering. There are provided a vehicle position estimation unit 2 for calculating the position of a vehicle based on an output from a sensor for detecting a behavior of the vehicle, a wireless position estimation unit 1 for communicating with a wireless device 101 installed at an arbitrary position and for calculating the relative positions of the vehicle and the wireless device 101, and a position estimation parameter correction unit 3 for correcting parameters used for calculating at least the position of the vehicle and information about the cornering angle of the vehicle by the vehicle position estimation unit 2. The position estimation parameter correction unit 3 compares an amount of movement of the vehicle calculated by the wireless position estimation unit 1 with an amount of movement of the vehicle calculated by the vehicle position estimation unit 2, and corrects the parameters.

15 Claims, 12 Drawing Sheets

(58) Field of Classification Search
USPC .......................................................... 342/457
See application file for complete search history.

(56) References Cited

FOREIGN PATENT DOCUMENTS

| | | | | | |
|---|---|---|---|---|---|
| CN | 110470309 | B | * | 4/2023 | ........... G01S 5/0284 |
| JP | H04-369425 | A | | 12/1992 | |
| JP | H08-005390 | A | | 1/1996 | |
| JP | 2000-214180 | A | | 8/2000 | |
| JP | 2003-028665 | A | | 1/2003 | |
| JP | 2013-250167 | A | | 12/2013 | |
| JP | 5512904 | B2 | * | 6/2014 | ......... C01B 3/10778 |
| JP | 2022142826 | A | * | 10/2022 | ............. G01C 21/30 |

* cited by examiner

FIG. 3
(a) CASE WHERE THERE IS ONE WIRELESS DEVICE IN VEHICLE
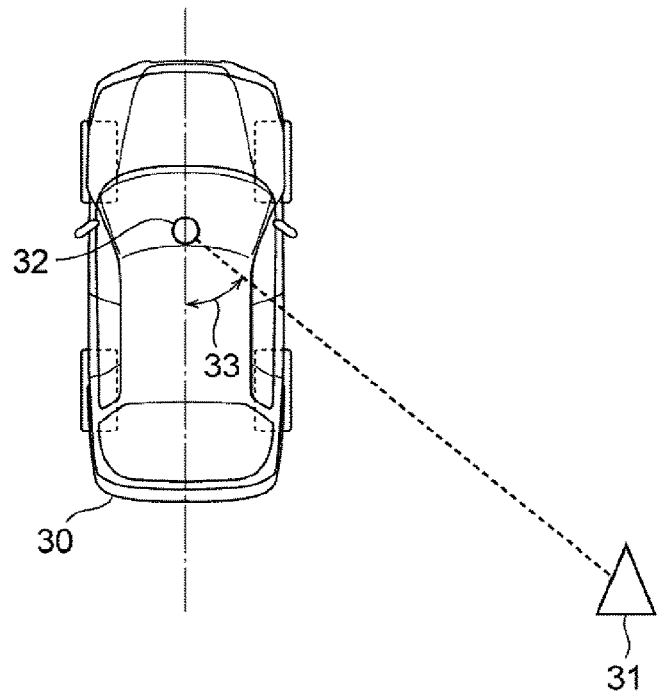
(b) CASE WHERE THERE ARE TWO WIRELESS DEVICES IN VEHICLE
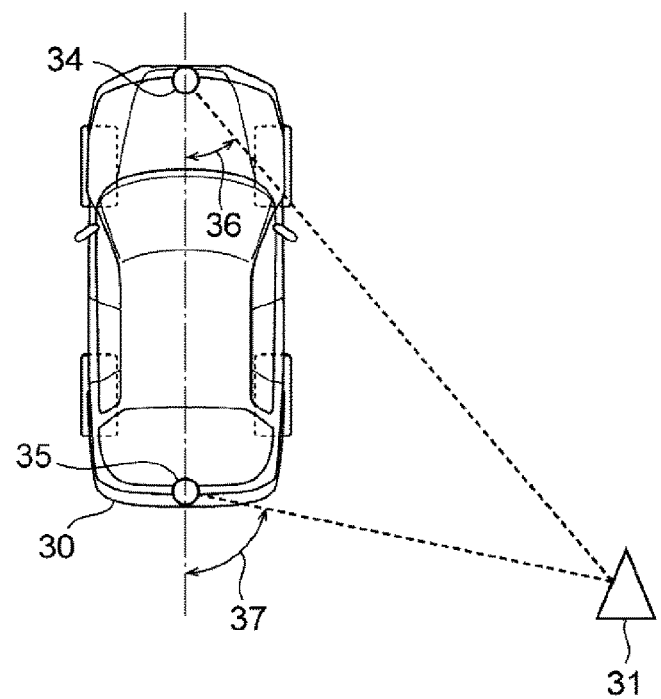

FIG. 8
(a) CASE WHERE VEHICLE TRAVELS STRAIGHT
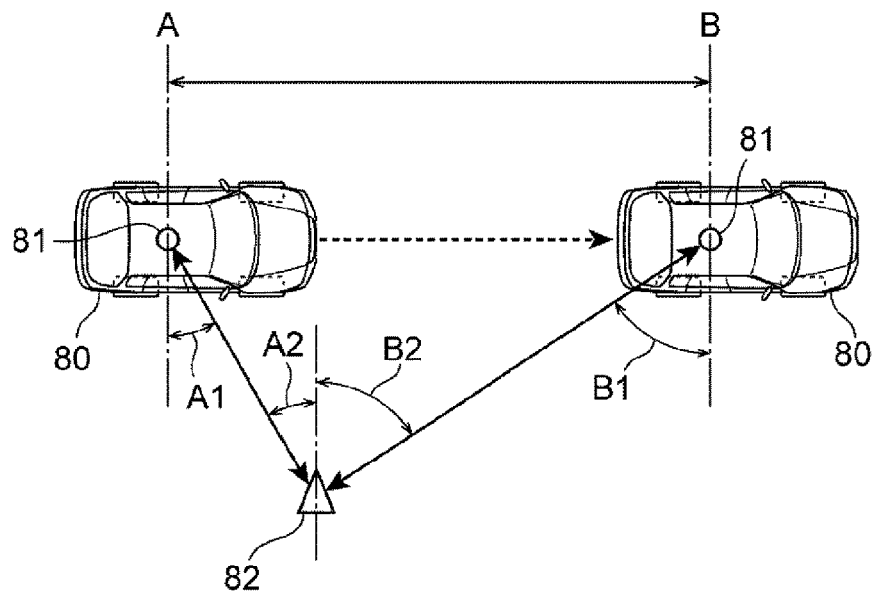
(b) CASE WHERE VEHICLE CORNERS
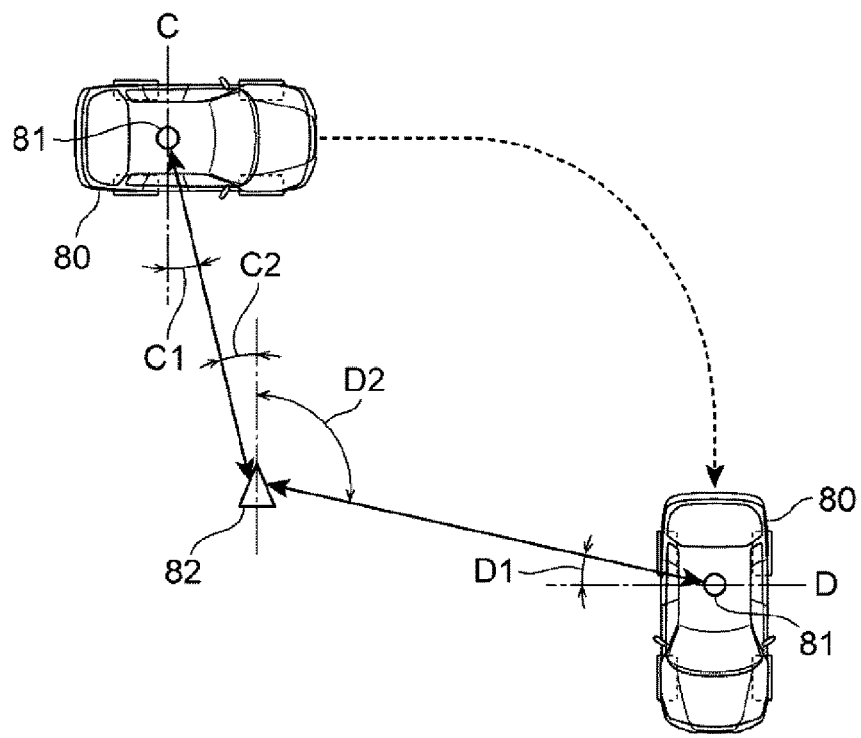

FIG. 9
(a) CASE WHERE VEHICLE TRAVELS STRAIGHT
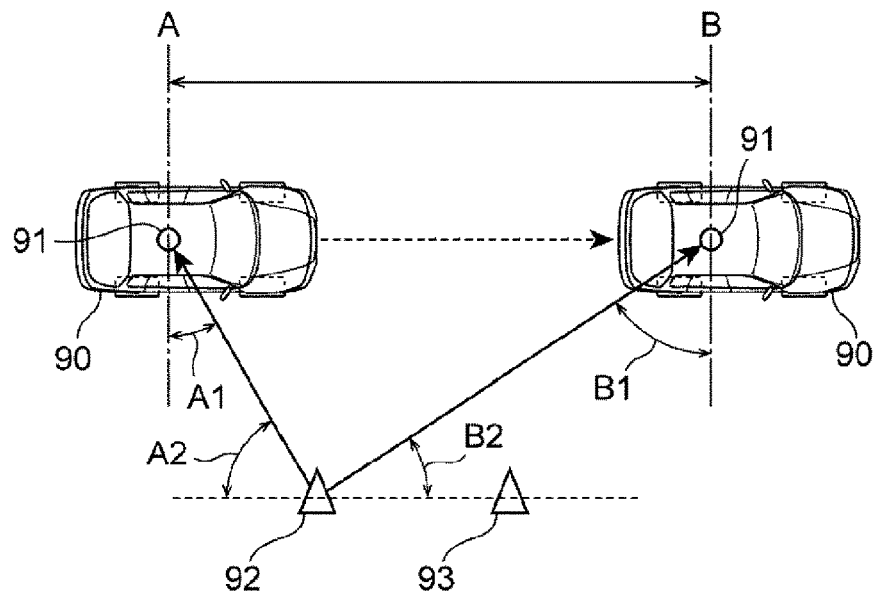
(b) CASE WHERE VEHICLE CORNERS
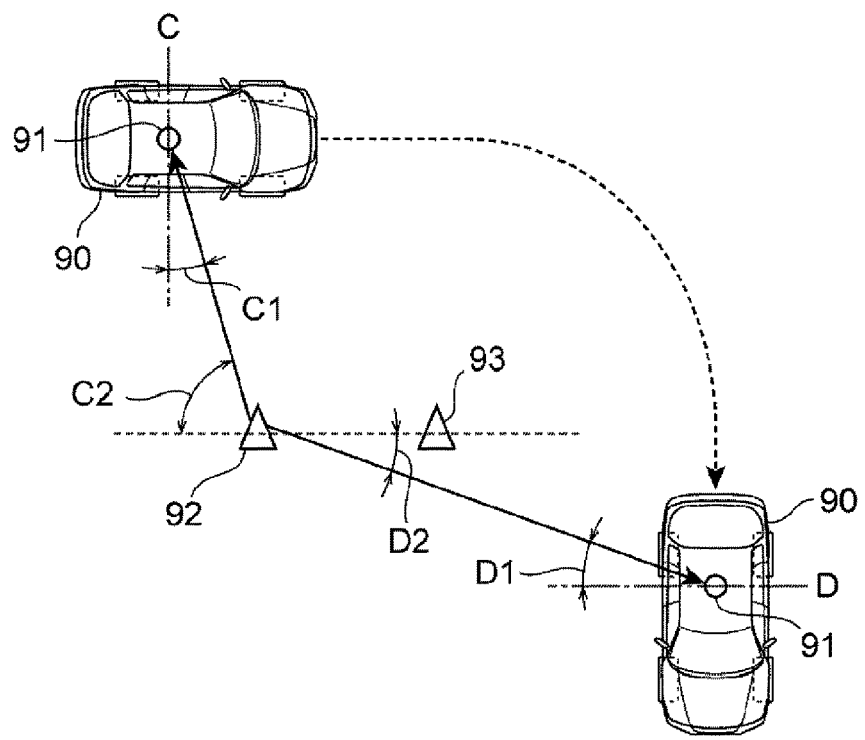

HOST VEHICLE POSITION ESTIMATION DEVICE AND HOST VEHICLE POSITION ESTIMATION METHOD

TECHNICAL FIELD

The present invention relates to own-vehicle position estimation devices and own-vehicle position estimation methods for estimating the position of an own vehicle from sensor information and the like, in a moving body such as a vehicle.

BACKGROUND ART

As techniques for estimating the own-vehicle position of a moving body such as a vehicle, there have been suggested various techniques, such as dead reckoning for estimating the own vehicle position using internal sensors for a wheel speed, a steering angle, a yaw rate and the like, visual odometry using video signals from cameras and the like, satellite positioning using a positioning satellite such as a GPS, and techniques using combinations of these techniques for estimating the own vehicle position. Furthermore, there have been developed techniques for controlling a moving body using the aforementioned techniques for assisting driver's driving manipulations, and automatic driving techniques for causing a moving body to automatically travel to a destination.

In order to realize such an automatic driving technique, it is necessary to estimate the position of an own vehicle with high accuracy on a map or a specific map, When the accuracy is insufficient, it is impossible to execute automatic driving, driving assistance, and the like. For example, dead reckoning is a technique for estimating the position of an own vehicle by integrating the amount of relative movement thereof using information from internal sensors about a wheel speed, a steering angle, a yaw rate and the like. For the calculation, specifications of the vehicle, such as a tire radius, a tread length, and a steering angle/curvature table are used. This may induce an error in the calculation of the own vehicle position, since the specifications of the vehicle may be different from actual values, depending on the state of the tires (the degree of wear, the magnitude of the air pressure therein, and the like) and manufacturing variations.

As a technique for solving such a problem of dead reckoning, there is the following prior art. PTL 1 discloses a vehicle movement distance calculation device adapted to calculate the distance of movement of a vehicle based on an output from a vehicle-speed sensor for detecting the speed of the vehicle, and based on a distance coefficient, in which the vehicle movement distance calculation device includes a beacon transmission device for emitting a signal to a predetermined area on a traveling passage of the vehicle, and a distance-coefficient correction unit for correcting the distance coefficient, based on an estimated distance corresponding to the predetermined area which is obtained when a beacon receiving device mounted on the vehicle is passing through the predetermined area, and based on an actual distance corresponding to the predetermined area (see claim 1).

CITATION LIST

Patent Literature

PTL 1: JP 2003-28665 A

SUMMARY OF INVENTION

Technical Problem

According to the technique disclosed in PTL 1, it is possible to calculate the distance of movement by comparing an accurate distance and an estimated distance between the two beacons. This enables improving the accuracy of the distance of movement. However, since the amount of movement in cornering directions is not taken into consideration, it is difficult to estimate the own vehicle position with high accuracy in a plane such as a map.

The present invention has been made in view of the aforementioned circumstances, and it is an object of the present invention to provide an own-vehicle position estimation device and an own-vehicle position estimation method which are capable of estimating the position of an own vehicle with high accuracy, including not only one-dimensional distances of movement but also two-dimensional directions of cornering.

Solution to Problem

A representative example of the invention disclosed in the present application is as follows. Namely, there is provided an own-vehicle position estimation device including a vehicle position estimation unit for calculating a position of a vehicle based on an output from a sensor for detecting a behavior of the vehicle, in which the own-vehicle position estimation device further includes a wireless position estimation unit for communicating with a wireless device installed at an arbitrary position and for calculating relative positions of the vehicle and the wireless device, and a position estimation parameter correction unit for correcting a parameter used for calculating at least the position of the vehicle and information about a cornering angle of the vehicle by the vehicle position estimation unit, and the position estimation parameter correction unit compares an amount of movement of the vehicle calculated by the wireless position estimation unit with an amount of movement of the vehicle calculated by the vehicle position estimation unit, and corrects the parameter.

Advantageous Effects of Invention

According to an aspect of the present invention, the position of a vehicle and information about the cornering angle of the vehicle can be calculated with high accuracy, which enables estimating the position of the own vehicle, including two-dimensional directions of corning, only by an internal sensor. Furthermore, it is possible to ensure the accuracy of the own-vehicle position estimation, even in scenes where an external sensor such as a camera or a positioning satellite cannot be used.

Other problems, structures and effects than those described above will be clarified by the following description of examples.

BRIEF DESCRIPTION OF DRAWINGS

FIG. 3 is a view illustrating an example of a relative position calculation method using a wireless device, in which (a) is a view illustrating a case where there is one wireless device in the vehicle, and (b) is a view illustrating a case where there are two wireless devices in the vehicle.

FIG. 8 is a view illustrating an example of a method for calculating the direction of an own vehicle using a wireless device, in which (a) is a view illustrating a case where the vehicle travels straight, and (b) is a view illustrating a case where the vehicle corners.

FIG. 9 is a view illustrating another example of the method for calculating the direction of an own vehicle using a wireless device, in which (a) is a view illustrating a case where the vehicle travels straight, and (b) is a view illustrating a case where the vehicle corners.

DESCRIPTION OF EMBODIMENTS

Hereinafter, examples of the present invention will be described with reference to the drawings.

Figure 1:
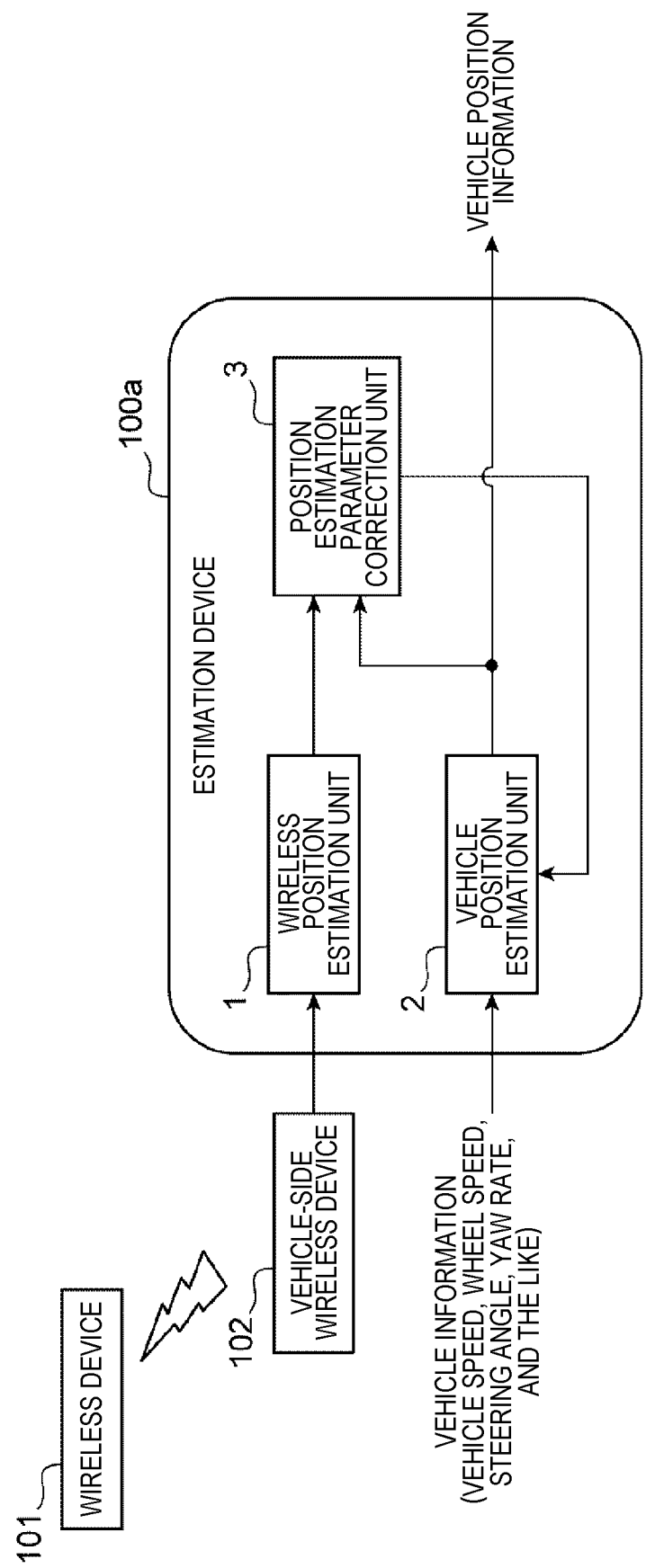
FIG. 1 is a schematic view of the structure of an own-vehicle position estimation device according to an example of the present invention.
Figure 2:
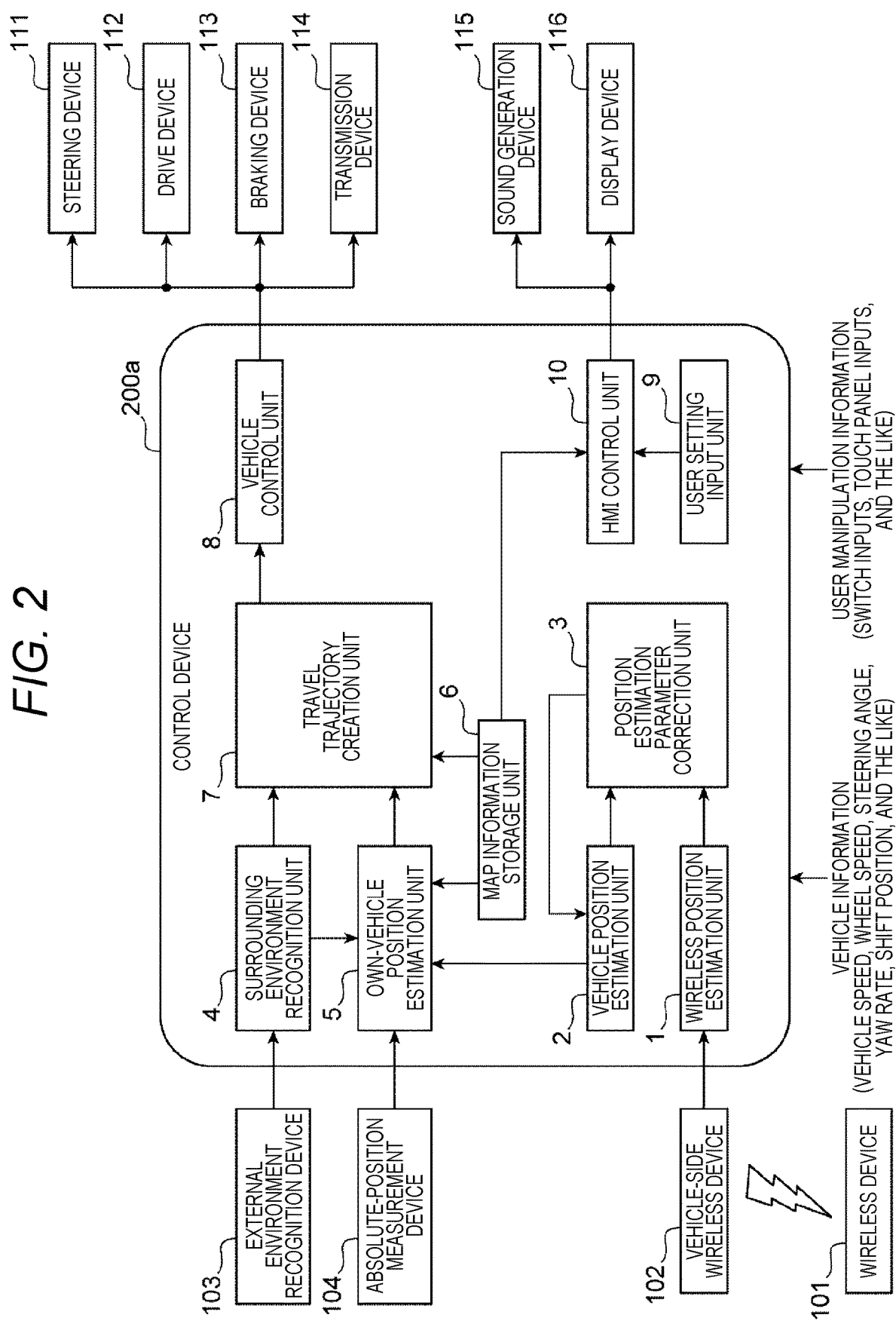
FIG. 2 is a schematic view of the structure of a vehicle control device according to an example of the present invention.

FIGS. 1 and 2 are schematic views of the structures of an own-vehicle position estimation device according to an example of the present invention, and a vehicle control device equipped with an own-vehicle position estimation function provided by the own-vehicle position estimation device. The own-vehicle position estimation device (which may be referred to as the estimation device, hereinafter) 100a, and the vehicle control device (which may be referred to as the control device, hereinafter) 200a illustrated in FIGS. 1 and 2 are constituted by, for example, a computer mounted on a vehicle (own vehicle) and adapted to estimate and control the position of the own vehicle. By executing programs stored in a storage medium which is not illustrated, the own-vehicle position estimation device 100a and the vehicle control device 200a function as a wireless position estimation unit 1, a vehicle position estimation unit 2, a position estimation parameter correction unit 3, a surrounding environment recognition unit 4, an own-vehicle position estimation unit 5, a map information storage unit 6, a user setting input unit 9, a HMI control unit 10, a travel trajectory creation unit 7, and a vehicle control unit 8. Incidentally, the respective wireless position estimation units 1, the respective vehicle position estimation units 2, and the respective position estimation parameter correction units 3 illustrated in both FIGS. 1 and 2 have equivalent functions.

The estimation device 100a is connected to a vehicle-side wireless device 102 provided in the own vehicle, and the vehicle-side wireless device 102 can transmit and receive information to and from a wireless device 101 installed outside the own vehicle through wireless communication. Further, the estimation device 100a is connected to transmission paths such as CAN (not illustrated) or dedicated lines in the own vehicle. The estimation device 100a receives vehicle information about a vehicle speed, a wheel speed, a steering angle, a yaw rate and the like of the own vehicle through these transmission paths, and outputs calculated vehicle position information.

The control device 200a is connected to a steering device 111, a drive device 112, a braking device 113, and a transmission device 114 in the own vehicle, and an external environment recognition device 103, an absolute-position measurement device 104, a sound generation device 115, and a display device 116 which are provided in the own vehicle. Further, the control device 200a is connected to transmission paths such as CAN (not illustrated) or dedicated lines in the own vehicle. The control device 200a receives vehicle information about a vehicle speed, a wheel speed, a steering angle, a yaw rate, a shift position and the like of the own vehicle, and user manipulation information about switch inputs, touch panel inputs and the like, through these transmission paths.

The wireless device 101 is a device capable of transmitting and receiving information using a wireless system installed at an arbitrary position outside the own vehicle, and examples thereof include a Bluetooth (registered trademark) beacon, an optical beacon, a radio wave beacon, and the like. Each beacon and the vehicle-side wireless device 102 in the own vehicle can transmit and receive information to and from each other through wireless communication and, thus, transmit and receive information about positions, information about surrounding environments, and the like, to and from each other.

The vehicle-side wireless device 102 is a device capable of transmitting and receiving information to and from the wireless device 101 installed outside the own vehicle through wireless communication. The vehicle-side wireless device 102 is installed in the own vehicle in conformance to the communication standard of the wireless device 101. Information acquired by the vehicle-side wireless device 102 is output to the estimation device 100a (the control device 200a) through a transmission path such as a dedicated line.

Incidentally, in a case where the Bluetooth (registered trademark) standard is used for wireless communication (wireless scheme) between the wireless device 101 and the vehicle-side wireless device 102, it is possible to perform position estimation with high accuracy by using a direction detection function: Angle of Arrival (AoA)/Angle of Departure (AoD) added to the Bluetooth (registered trademark) core specification version 5.1.

The external environment recognition device 103 is a device for acquiring information about an environment surrounding the own vehicle, and is constituted by, for example, four in-vehicle cameras for respectively capturing surrounding environments at the front, the rear, the right side, and the left side of the own vehicle. Images obtained by the in-vehicle cameras are output to the control device 200a, as analog data or after being subjected to A/D conversion, through a transmission path such as a dedicated line. Also, it is possible to use stereo cameras as other in-vehicle cameras. Further, instead of in-vehicle cameras, it is also possible to use a radar for measuring a distance to an object using a millimeter wave or laser light, a sonar for measuring a distance to an object using an ultrasonic wave, or the like. These devices such as in-vehicle cameras output information about a distance to a detected object and about an azimuth(direction) thereof, to the control device 200*a* through a transmission path such as a dedicated line.

The absolute-position measurement device 104 is a device for acquiring information about the absolute position of the own vehicle on a map, and is constituted by, for example, a global navigation satellite system (GNSS) such as GPS or GLONASS. Position information obtained by the GNSS is output to the control device 200*a* through a transmission path such as CAN or a dedicated line. Furthermore, it is also possible to acquire information about the position of the own vehicle, using road-to-vehicle communication and the like, besides the GNSS.

The steering device 111 is constituted by an electric power steering, a hydraulic power steering, or the like which is capable of controlling the steering angle through an electric or hydraulic actuator or the like according to drive commands from the outside.

The drive device 112 is constituted by an engine system capable of controlling engine torque through an electric throttle or the like according to drive commands from the outside, an electric powertrain system capable of controlling a driving force of a motor or the like according to drive commands from the outside, or the like.

The braking device 113 is constituted by an electric brake, a hydraulic brake, or the like which is capable of controlling the braking force through an electric or hydraulic actuator or the like, according to braking commands from the outside.

The transmission device 114 is constituted by a transmission or the like which is capable of switching between forward travelling and backward travelling through an electric or hydraulic actuator or the like, according to shift commands from the outside.

The sound generation device 115 is constituted by a speaker or the like, and functions as an information notification unit for outputting warnings, voice guidance and the like to the driver.

The display device 116 is constituted by a display of a navigation device or the like, a meter panel, a warning light, or the like. The display device 116 functions as an information notification unit for notifying the driver of information such as a screen for manipulating the control device 200*a*, and a warning screen for visually notifying the driver that there is a risk of collision of the own vehicle with an obstacle.

<Description of Functions of the Control Device 200*a* (the Estimation Device 100*a*)>

The wireless position estimation unit 1 calculates the amount of movement (the distance of movement, the travelling route, and the like) of the own vehicle, based on the relative positional relationship (the direction, the distance, and the like) between the wireless device 101 and the vehicle-side wireless device 102 which has been input from the vehicle-side wireless device 102.

The vehicle position estimation unit 2 calculates the position of the vehicle through an own-vehicle position estimation method called odometry, dead reckoning, or the like, using information from sensors for detecting behaviors of the vehicle, such as a vehicle speed, a wheel speed, a steering angle, and a yaw rate of the own vehicle. Incidentally, the own-vehicle position estimation method used herein calculates the amount of movement and the angular change of the vehicle within a minute time interval and integrates them to calculate the position of the vehicle with respect to an arbitrary point, thereby calculating the amount of movement (the distance of movement, the traveling route, and the like) of the own vehicle.

The position estimation parameter correction unit 3 compares the amount of movement calculated by the wireless position estimation unit 1 with the amount of movement calculated by the vehicle position estimation unit 2. Further, the position estimation parameter correction unit 3 corrects parameters used in the calculations by the vehicle position estimation unit 2 in such a way as to decrease the difference between both the amounts of movement. In this case, the parameters are parameters used for the calculations of the vehicle position and the cornering angle information by the vehicle position estimation unit 2. These parameters include, for example, a distance coefficient for correcting a traveled distance, a cornering coefficient for correcting the amount of cornering, a one-pulse distance coefficient for correcting the distance per pulse of wheel speed pulses, a tire diameter coefficient for correcting the tire radius or the tire diameter, a tread length coefficient for correcting the tread length, and a cornering curvature coefficient for correcting the cornering curvature with respect to the steering angle. Also, it is possible to treat, as parameters, the one pulse distance of wheel speed pulses, the tire radius, the tire diameter, the tread length, and the cornering curvature with respect to the steering angle which are vehicle specifications.

The surrounding environment recognition unit 4 has a determination function as follows. That is, the surrounding environment recognition unit 4 detects the shape and the position of an object around the own vehicle, such as a stationary stereoscopic object, a moving object, a road surface painting such as a lane boundary line (a dividing line), or a sign, by using data of captured images of the surrounding of the own vehicle and measured distance information which have been input from the external environment recognition device 103. Further, the surrounding environment recognition unit 4 detects convexity and concavity and the like of the road surface and determines whether or not the own vehicle can travel on the road surface. Such stationary stereoscopic objects include, for example, parked vehicles, and constructions such as guardrails, walls, poles, pylons, curbstones, and car stops. Further, such moving objects include, for example, pedestrians, bicycles, motorcycles, vehicles and the like. Hereinafter, such stationary stereoscopic objects and moving objects will be collectively referred to as obstacles. The shape and position of an object may be detected by known pattern matching, but may be also detected using other techniques.

Further, based on information about the detected shape and position of an object, and based on the result of determination as to whether or not the own vehicle can travel on the road surface, the surrounding environment recognition unit 4 detects a lane position where the own vehicle can travel, a space at an intersection where the own vehicle can corner, and the like, in a case where the own vehicle travels on a general road, for example. Further, in the case of a vehicle-stopping place, the surrounding environment recognition unit 4 detects a vehicle-stoppable space which is a space where the own vehicle can be stopped, a travelable space which is a space where the own vehicle can perform turning and the like for stopping in the vehicle-stoppable space, and the like. Incidentally, this travelable space is defined using the passage width, the distance to an obstacle ahead of the own vehicle, the position of an obstacle (a stopped vehicle) adjacent to the vehicle-stoppable space, and the like.

The own-vehicle position estimation unit 5 estimates the position of the own vehicle on the map stored in the map information storage unit 6, using information about the absolute position input from the absolute-position measurement device 104, the amount of movement of the own vehicle input from the vehicle position estimation unit 2, and the like. Further, in this case, the method for estimating the position of the own vehicle on the map is varied depending on the available map. In a case where the available map is not a high-precision map like a map of a conventional navigation device, for example, a map matching method which is a known technique is used for estimating the position of the own vehicle. In a case of a high-precision map, the position of the own vehicle on the high-precision map is estimated, based on information about a sign or a road surface painting such as a lane boundary line which has been detected by the surrounding environment recognition unit 4, and other obstacles and landmarks stored on the high-precision map.

The map information storage unit 6 stores map data for adapting to various applications. For example, in a case of application to a conventional navigation device, the map information storage unit 6 stores road information necessary for route search and route guidance, and information about convenience stores, gas stations, various facilities, and the like. Also, in a case of application to automatic driving, the map information storage unit 6 stores shape data close to actual road shapes expressed by polygons, polylines, and the like, and detailed information such as traffic regulation information (speed limits, types of vehicles which can pass, and the like), lane division (main lines, passing lanes, climbing lanes, straight lanes, left-turn lanes, right-turn lanes, and the like), and presence or absence of traffic lights, signs, and the like (if present, information about the positions thereof).

Information about user manipulations such as switch inputting, touch panel inputting, and the like is input to the user setting input unit 9, so that the user setting input unit 9 receives settings of destinations, settings of routes, and the like.

The HMI control unit 10 appropriately creates information to be notified to the user, according to the situation, and outputs the information to the sound generation device 115 and the display device 116. Further, if a route search instruction is provided by the user, the HMI control unit 10 calculates (searches) a route which matches route search conditions for the set destination and, further, the HMI control unit 10 notifies the user thereof. In this case, as a specific method for route search, it is possible to use a known method.

The travel trajectory creation unit 7 creates a trajectory for moving the own vehicle from the current position of the own vehicle to a target position. Further, the travel trajectory creation unit 7 calculates a target speed for traveling on the created trajectory, using information about the speed limits, the curvatures of the trajectory, the traffic lights, the temporary stop positions in map information, the speed of a preceding vehicle, and the like. For example, in a case of traveling on a general road, the travel trajectory creation unit 7 sets a destination using a navigation device or the like, and creates a trajectory from information about the positional relationship between the own vehicle and obstacles, lane positions and the like during traveling toward the destination. Further, in a case of a vehicle-stopping place, the travel trajectory creation unit 7 sets a target vehicle-stopping position at which the own vehicle is to be stopped in a vehicle-stoppable space, from the positional relationship between the own vehicle and obstacles. Further, the travel trajectory creation unit 7 creates a trajectory up to this target vehicle-stopping position.

The vehicle control unit 8 controls traveling of the own vehicle along the target trajectory created by the travel trajectory creation unit 7. The vehicle control unit 8 calculates a target steering angle and a target speed based on the target trajectory. When a collision between the own vehicle and an obstacle is predicted, the vehicle control unit 8 calculates the target steering angle and the target speed in such a way as to prevent the own vehicle from colliding with the obstacle. Further, the vehicle control unit 8 outputs a target steering torque value for realizing the target steering angle, to the steering device 111. Further, the vehicle control unit 8 outputs a target engine torque value and a target brake pressure value for realizing the target speed, to the drive device 112 and the braking device 113. Further, when it is necessary to change the traveling direction of the own vehicle, the vehicle control unit 8 outputs a shift command to the transmission device 114.

Next, there will be described methods for calculating the relative position of a wireless device outside the vehicle, with reference to FIGS. 3(*a*) and 3(*b*).

FIG. 3 (*a*) illustrates a case where there is one wireless device in the vehicle, in a situation where this wireless device is communicating with a wireless device (which will be referred to as a wireless beacon, hereinafter) outside the vehicle. A vehicle-side wireless device 32 mounted on an own vehicle 30 is communicating with a wireless beacon 31. In a case where the wireless standard used here is Bluetooth (registered trademark), it is possible to detect the direction 33 of the wireless beacon 31 viewed from the vehicle-side wireless device 32, by utilizing the aforementioned direction detection function of Bluetooth (registered trademark). Furthermore, it is possible to estimate the distance by using radio-wave intensity information which has been conventionally used in Bluetooth (registered trademark). This makes it possible to determine the relative position of the wireless beacon 31 with respect to the own vehicle 30.

FIG. 3 (*b*) illustrates a case where there are two wireless devices in the vehicle, in a situation where these wireless devices are communicating with a wireless beacon. The vehicle-side wireless devices 34 and 35 mounted on the own vehicle 30 are mounted at positions spaced apart from each other, and are each communicating with the wireless beacon 31. Similarly to in FIG. 3(*a*), in a case where the wireless standard used here is Bluetooth (registered trademark), it is possible to detect the direction 36 of the wireless beacon 31 viewed from the vehicle-side wireless device 34 and the direction 37 of the wireless beacon 31 viewed from the vehicle-side wireless device 35. When the vehicle-side wireless devices 34 and 35 are installed at known positions, if the directions 36 and 37 are detected, this makes it possible to determine the relative position of the wireless beacon 31 with respect to the own vehicle 30 using trigonometry.

Further, in FIGS. 3(*a*) and 3(*b*), it is also possible to detect the direction of each wireless device 32, 34 or 35 in the own vehicle 30 viewed from the wireless beacon 31. By transmitting information about this direction from the wireless beacon 31 to each of the vehicle-side wireless devices 32, 34, and 35 in the own vehicle 30, it is also possible to calculate the change of the azimuth of the own vehicle 30.

Next, the configuration of a wireless beacon will be described with reference to FIG. 4.

Figure 4:
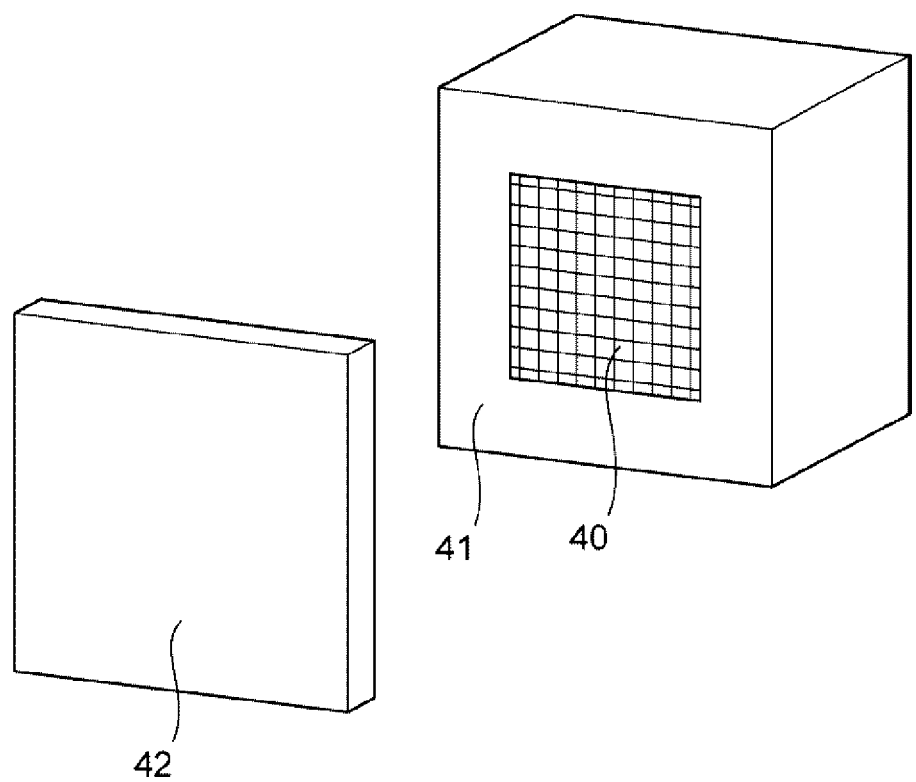
FIG. 4 is a view illustrating an example of the configuration of a wireless beacon according to an example of the present invention.

FIG. 4 illustrates an example of a wireless beacon. A wireless module 40 is molded of a resin 41, and is configured to be lidded with a resin 42. Further, the wireless module 40 can be driven by a power source such as a built-in battery. For example, a photovoltaic module may be installed on the lid made of the resin 42 in order to enable driving the wireless module 40 without supplying a power source thereto from the outside. Also, a power source line may be drawn out therefrom, in order to enable supplying a power source thereto from the outside.

<Description of Contents of Processing in the Estimation Device 100a>

Next, a procedure of processing in the estimation device 100a will be described using a flowchart.

Figure 5:
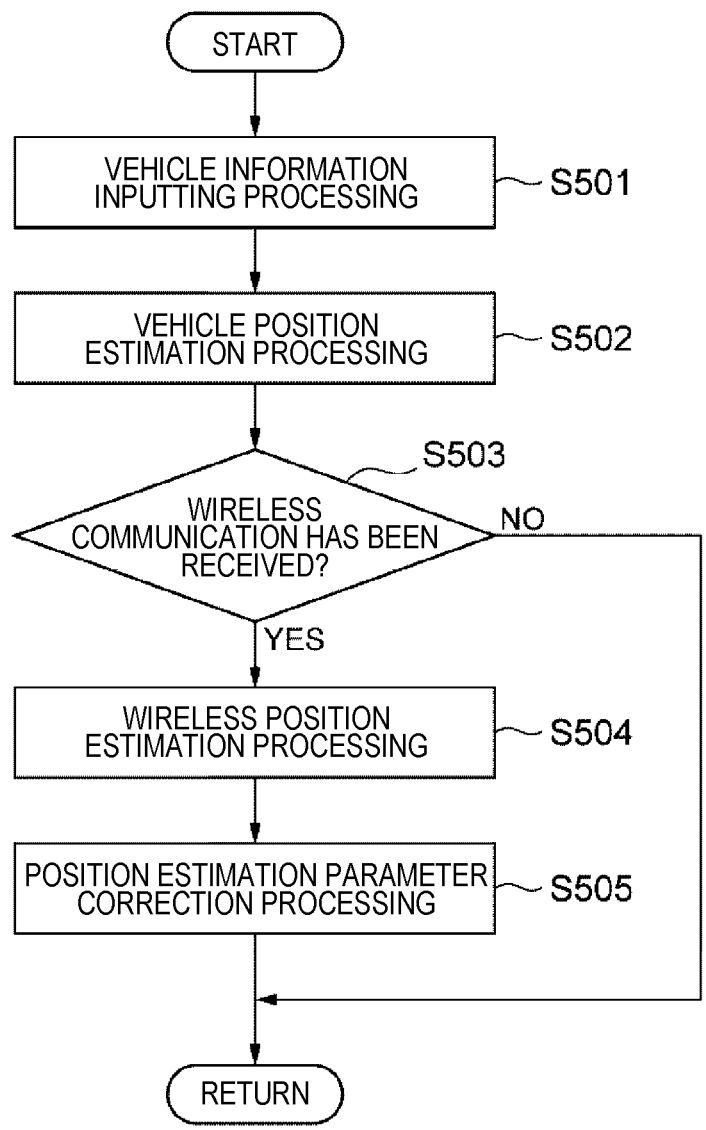
FIG. 5 is a flowchart of an example of vehicle position estimation processing according to an example of the present invention.
Figure 6:
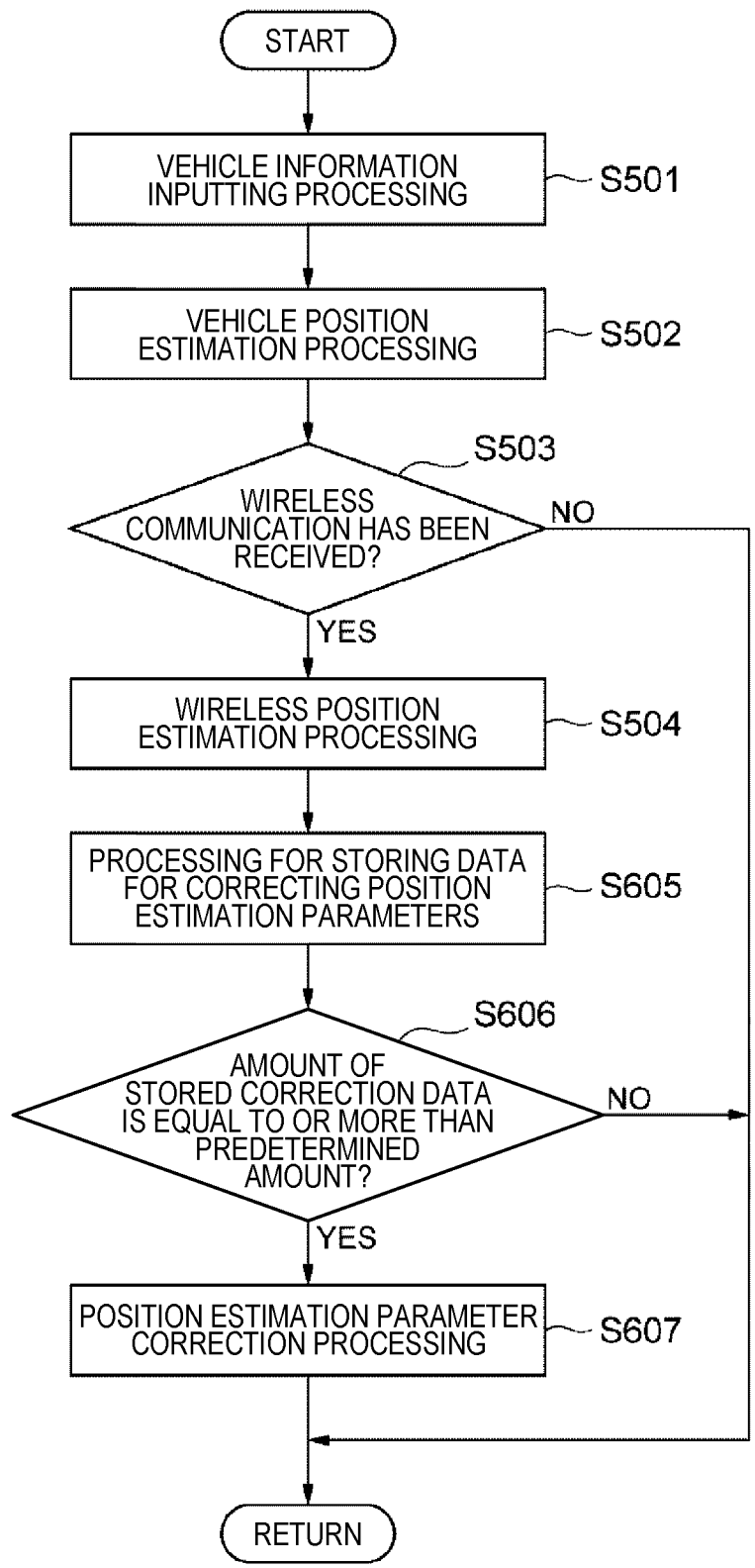
FIG. 6 is a flowchart of another example of vehicle position estimation processing according to an example of the present invention.

FIGS. 5 and 6 are flowcharts illustrating an example of the procedure of processing (vehicle position estimation processing) in the estimation device 100a, and two methods will be described here.

In processing S501 in FIG. 5, vehicle information such as a vehicle speed, a wheel speed, a steering angle, and a yaw rate of the own vehicle is input. In processing S502, the position of the vehicle and the amount of movement are calculated using the vehicle information by the vehicle position estimation unit 2.

In processing S503, it is determined whether or not wireless communication with a wireless beacon has been received. If wireless communication has been received, the procedure proceeds to processing S504. If wireless communication has not been received, the series of processing ends.

In the processing S504, the amount of movement of the own vehicle is calculated by the wireless position estimation unit 1, using information about the relative positions of the own vehicle and the wireless beacon, which has been received and calculated by the vehicle-side wireless device 102. Then, the procedure proceeds to processing S505.

In the processing S505, in the position estimation parameter correction unit 3, comparison is made between the amount of movement of the own vehicle calculated in the processing S502, and the amount of movement of the own vehicle calculated in the processing S504, and the parameters used in the vehicle position estimation unit 2 are corrected. Then, the series of processing ends.

As a method for correcting the parameters in this case, for example, there are methods as follows. In this case, the parameters are parameters used in the calculations of at least the vehicle position and the cornering angle information by the vehicle position estimation unit 2.

Distance Coefficient for Correcting the Travelled Distance

During straight travelling of the own vehicle, when the travelled distance calculated in the processing S502 is $X1$, and the travelled distance calculated in the processing S504 is $X2$, the distance coefficient is defined as $Kx=X2/X1$, and the travelled distance calculated in the processing S502 is multiplied by $Kx$ in calculation.

Cornering Coefficient for Correcting the Amount of Cornering

During cornering of the own vehicle, when the cornering angle calculated in the processing S502 is $C1$, and the cornering angle calculated in the processing S504 is $C2$, the cornering coefficient is defined as $Kc=C2/C1$, and the cornering angle calculated in the processing S502 is multiplied by $Kc$ in calculation.

One-Pulse Distance Coefficient for Correcting the Distance Per Pulse of Wheel Speed Pulses During straight travelling of the own vehicle, when the travelled distances of the respective wheels (four wheels) calculated in the processing S502 are $X11$, $X12$, $X13$, and $X14$, and the travelled distance calculated in the processing S504 is $X2$, the one-pulse distance coefficients for the respective wheels are defined as $Kx1=X2/X11$, $Kx2=X2/X12$, $Kx3=X2/X13$, and $Kx4=X2/X14$, and the travelled distances of the respective wheels calculated in the processing S502 are multiplied by $Kx1$, $Kx2$, $Kx3$, and $Kx4$, respectively, in calculation.

Tire Diameter Coefficient for Correcting the Tire Radius or the Tire Diameter

During straight travelling of the own vehicle, when the travelled distances of the respective wheels (four wheels) calculated in the processing S502 are $X11$, $X12$, $X13$, and $X14$, and the travelled distance calculated in the processing S504 is $X2$, the tire diameter coefficients for the respective wheels are defined as $Kd1=X2/X11$, $Kd2=X2/X12$, $Kd3=X2/X13$, and $Kd4=X2/X14$, and the tire radiuses or the tire diameters of the respective wheels used in the processing S502 are multiplied by $Kd1$, $Kd2$, $Kd3$, and $Kd4$, respectively, in calculation.

Tread Length Coefficient for Correcting the Tread Length

During cornering of the own vehicle, when the cornering angle calculated in the processing S502 is $C1$, and the cornering angle calculated in the processing S504 is $C2$, the tread length coefficient is defined as $Kt=C2/C1$, and the tread length used in the processing S502 is multiplied by $Kt$ in calculation.

Cornering Curvature Coefficient for Correcting the Cornering Curvature with Respect to the Steering Angle During cornering of the own vehicle, when the cornering angle calculated in the processing S502 is $C1$, and the cornering angle calculated in the processing S504 is $C2$, the cornering curvature coefficient is defined as $Kr=C2/C1$, and the cornering curvature with respect to the steering angle which is used in the processing S502 is multiplied by $Kr$ in calculation.

One-Pulse Distance of Wheel Speed Pulses

During straight travelling of the own vehicle, when the numbers of pulses for the respective wheels (four wheels) calculated in the processing S502 are $P1$, $P2$, $P3$, and $P4$, and the travelled distance calculated in the processing S504 is $X2$, the one-pulse distances for the respective wheels are defined as $X2/P1$, $X2/P2$, $X2/P3$, and $X2/P4$, respectively, which are to be used in the processing S502.

Tire Radius

During straight travelling of the own vehicle, when the numbers of pulses for the respective wheels (four wheels) calculated in the processing S502 are $P1$, $P2$, $P3$, and $P4$, and the travelled distance calculated in the processing S504 is $X2$, assuming that the number of pulses per rotation of the tire is $PI$, the tire radiuses of the respective wheels are defined as $PI \times X2/2/\pi/P1$, $PI \times X2/2/\pi/P2$, $PI \times X2/2/\pi/P3$, and $PI \times X2/2/\pi/P4$, respectively, which are to be used in the processing S502.

Further, it is also possible to calculate the tread length, and the cornering curvature with respect to the steering angle, from the information about the cornering angle calculated in the processing S504, using an equation of motion for a vehicle or the like.

The parameter correction method described above is basically based on the concept of correcting the respective parameters in such a way as to reduce the difference between the amount of movement of the own vehicle calculated by the wireless position estimation unit 1 and the amount of movement of the own vehicle calculated by the vehicle position estimation unit 2. However, in the case of the aforementioned method, the parameters may be suddenly changed. For coping therewith, it is possible to perform the correction in such a way as to assign a predetermined weight (for example, 20%) to the parameters before the correction, which can prevent them from being suddenly changed. By doing this, in the event of erroneous calculations of the parameters due to errors of sensors and the like, it is possible to reduce the influence thereof.

Also, it is possible to add a vehicle-speed condition to the correction conditions. Specifically, the correction of the parameters can be performed under a condition that the vehicle speed of the own vehicle is equal to or less than a predetermined vehicle speed (for example, 100 km/h or less). Furthermore, as the vehicle speed of the own vehicle is lower, the travelling distance per unit time interval is smaller, so that the distance resolution for calculating the amount of movement of the own vehicle is made smaller. Therefore, as the vehicle speed of the own vehicle is lower, the weight assigned to the parameters before the correction can be increased, which enables efficiently performing the correction. Incidentally, it is also important to enable flexibly changing the vehicle-speed condition depending on the communication standard of the wireless device to be used, and the actual measurement accuracy.

Also, it is possible to add an amount-of-movement condition to the correction conditions. Specifically, the correction of the parameters can be performed under a condition that the amount of movement of the own vehicle calculated by the wireless position estimation unit 1 falls within a predetermined range (for example, equal to or more than 5 m but equal to or less than 100 m). Furthermore, if the amount of movement of the own vehicle is larger, this contributes to the correction more advantageously. Therefore, as the amount of movement of the own vehicle is larger, the weight assigned to the parameters before the correction can be increased. This enables efficiently performing the correction. Incidentally, it is also important to enable flexibly changing the amount-of-movement condition depending on the communication standard of the wireless device to be used, and the actual measurement accuracy.

It is also conceivable not to perform the correction, when there is a large amount of change (difference) from the parameters before the correction to the parameters after the correction (for example, when the amount of change is 50% or more), as a result of the comparison therebetween. In this case, there is a possibility of some abnormality in the wireless communication or the vehicle, erroneous detection by a sensor or the like, and there is a need for notifying the driver (occupant) in the own vehicle of the information (about the fact that correction is not performed).

Next, a flowchart of FIG. 6 will be described.

In the flowchart of FIG. 6, the same processing as the processing up to the processing S504 in the flowchart of FIG. 5 is performed.

Processing S605 is storing the correction values (correction data) for the respective parameters, which were calculated from the amount of movement of the own vehicle calculated by the wireless position estimation unit 1, and the amount of movement of the own vehicle calculated by the vehicle position estimation unit 2. Then, the procedure proceeds to processing S606 where it is determined whether or not the amount of the stored correction data is equal to or more than a predetermined amount (in other words, whether or not the number of times the correction data has been stored exceeds a predetermined number of times). If it is equal to or more than the predetermined amount, the procedure proceeds to processing S607. If it is less than the predetermined amount, the series of processing ends.

In the processing S607, statistical processing and the like are performed on the plurality of pieces of correction data having been stored, parameter correction processing similar to that in the processing S505 in FIG. 5 is performed. Then, the series of processing ends. In this case, the statistical processing includes, for example, a method using simple averaging, outlier removal, standard deviation, and variance. By performing them, it is possible to obtain the result of stable correction.

In this case, the correction values for the respective parameters are used as an object to be stored. However, parameter correction processing can be also performed as follows. That is, the difference between the amount of movement of the own vehicle calculated by the wireless position estimation unit 1 and the amount of movement of the own vehicle calculated by the vehicle position estimation unit 2 is stored, wherein these amounts of movements are used for calculation of the correction values for the respective parameters. Further, if the number of times the difference has been stored exceeds a predetermined number of times, statistical processing and the like may be performed on the predetermined number of difference values having been stored.

<Description of Contents of Processing in the Control Device 200a>

Next, there will be described an example of a processing procedure (driving assistance processing) in the control device 200a, with reference to a flowchart in FIG. 7.

Figure 7:
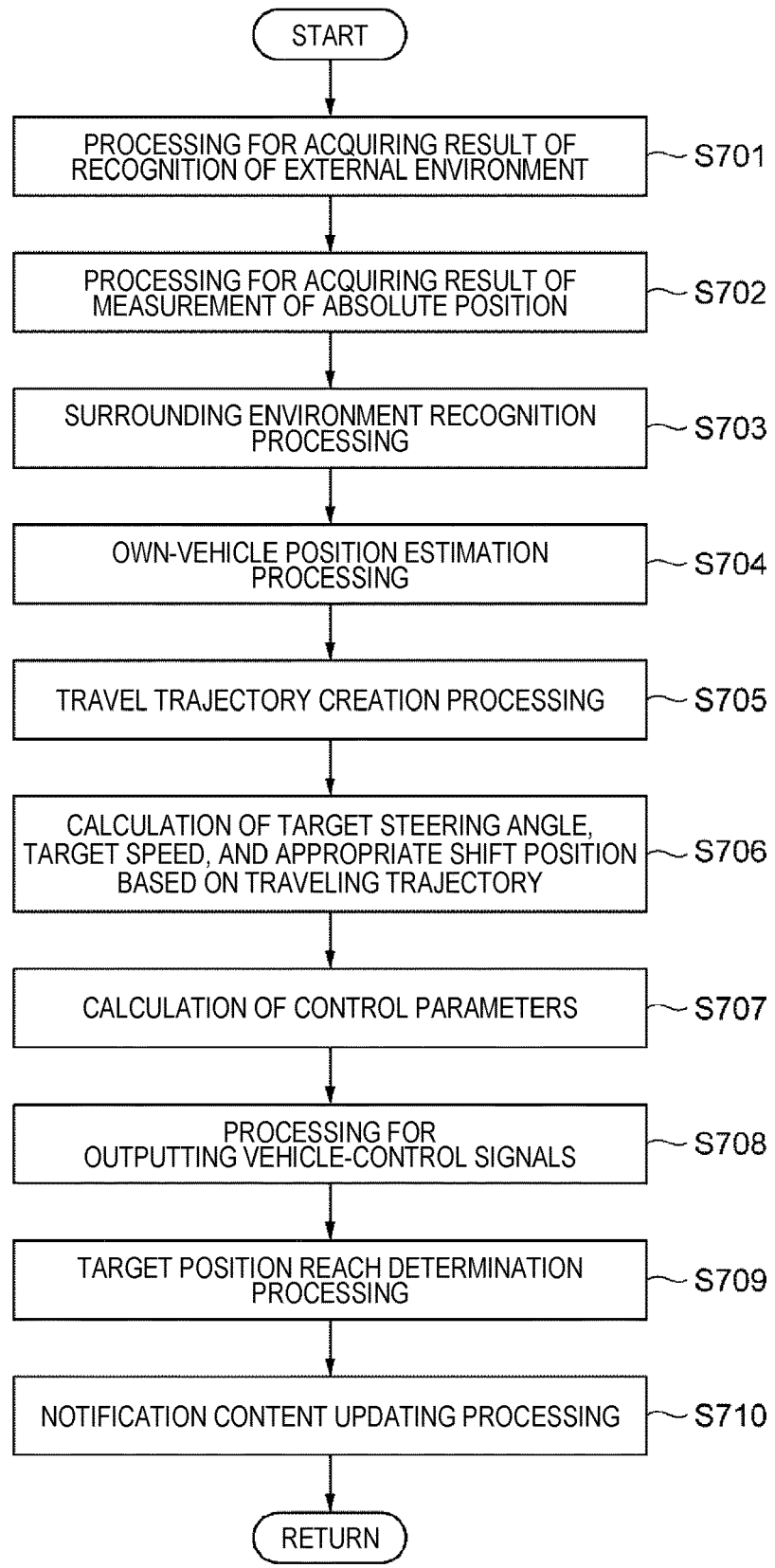
FIG. 7 is a flowchart of an example of driving assistance processing according to an example of the present invention.

In processing S701 in FIG. 7, the control device 200a acquires a result of recognition of an external environment from the external environment recognition device 103.

In processing S702, the control device 200a acquires a result of measurement of an absolute position from the absolute-position measurement device 104.

In processing S703, the surrounding environment recognition unit 4 detects a road surface painting such as a lane boundary line, a sign, an obstacle, a landmark, and the like around the own vehicle, based on the result of recognition of the external environment which was acquired in the processing S701.

In processing S704, the own-vehicle position estimation unit 5 estimates the position of the own vehicle, using the result of detection by the surrounding environment recognition unit 4, map information in the map information storage unit 6, and vehicle position information from the vehicle position estimation unit 2, based on the result of measurement of the absolute position which was acquired in the processing S702.

In processing S705, the travel trajectory creation unit 7 creates a trajectory for moving the own vehicle from the current position of the own vehicle to a target position.

In processing S706, the vehicle control unit 8 calculates a target steering angle, a target speed, and an appropriate shift position for traveling on the target trajectory (traveling trajectory) created in the processing S705.

In processing S707, the vehicle control unit 8 calculates control parameters for outputting the target steering angle value, the target speed value, and the appropriate shift position value calculated in the processing S706 to the steering device 111, the drive device 112, the braking device 113, and the transmission device 114, respectively. For example, the control parameters output to the steering device 111 include target steering torque for realizing the target steering angle. However, depending on the structure of the steering device 111, the target steering angle value may be directly output thereto. Further, the control parameters output to the drive device 112 and the braking device 113 include target engine torque, target brake pressure, and the like for realizing the target speed. However, depending on the structures of the drive device 112 and the braking device 113, the target speed value may be directly output thereto.

In processing S708, the vehicle control unit 8 outputs the control parameters calculated in the processing S707 as vehicle-control signals to the steering device 111, the drive device 112, the braking device 113, and the transmission device 114, respectively.

In processing S709, the control device 200a determines whether or not the target position has been reached.

In processing S710, if the target position has been reached in the processing S709, the HMI control unit 10 notifies the user of guidance indicating that the driving assist is ending, or if the target position has not been reached, the HMI control unit 10 notifies the user of guidance indicating that the driving assist is being performed, using the sound generation device 115 or the display device 116. Then, the processing ends.

As described above, it is possible to realize the driving support function by incorporating the basic functions of the own-vehicle position estimation device 100a into the vehicle control device 200a. Specifically, it is possible to secure the accuracy of the vehicle position estimation unit 2 for a long time period, in an indoor environment and the like where signals from the absolute-position measurement device 104 are interrupted. This enables continuing the driving assistance even in such environments.

Next, there will be described a specific method for calculating the cornering angle of the own vehicle through communication with a wireless beacon, with reference to FIGS. 8(a) and 8(b) and FIGS. 9(a) and 9 (b).

FIGS. 8(a) and 8(b) assume cases where the own vehicle communicates with one wireless beacon (at each point).

FIG. 8 (a) illustrates a situation where the own vehicle 80 travels straight from a point A to a point B beside a wireless beacon 82. At the point A, a vehicle-side wireless device 81 mounted on the own vehicle 80 and the wireless beacon 82 bidirectionally communicate with each other, which enables detecting the direction A1 of the wireless beacon 82 viewed from the vehicle-side wireless device 81, and the direction A2 of the vehicle-side wireless device 81 viewed from the wireless beacon 82. Further, as described with reference to FIGS. 3(a) and 3(b), the distance between the vehicle-side wireless device 81 and the wireless beacon 82 can also be detected. Thereafter, at the point B, the directions B1 and B2 and the distance can be similarly detected. In this case, with respect to the direction of the own vehicle 80 at the point A as a reference, the direction of the own vehicle 80 at the point B can be expressed as (A1+B1)−(A2+B2), which has a value close to 0 when the own vehicle 80 travels straight.

FIG. 8 (b) illustrates a situation where the own vehicle 80 corners from a point C to a point D beside the wireless beacon 82. At the point C, the vehicle-side wireless device 81 mounted on the own vehicle 80 and the wireless beacon 82 bidirectionally communicate with each other, which enables detecting the direction C1 of the wireless beacon 82 viewed from the vehicle-side wireless device 81, and the direction C2 of the vehicle-side wireless device 81 viewed from the wireless beacon 82. Further, as described with reference to FIGS. 3(a) and 3(b), the distance between the vehicle-side wireless device 81 and the wireless beacon 82 can also be detected. Thereafter, at the point D, the directions D1 and D2 and the distance can be similarly detected. In this case, with respect to the direction of the own vehicle 80 at the point C as a reference, the direction of the own vehicle 80 at the point D can be expressed as (C1+D1)−(C2+D2), which has a value of about 90 degrees when the own vehicle 80 corners as in FIG. 8(b).

Therefore, when there is one wireless beacon with which the own vehicle (the wireless position estimation unit 1 therein) is communicating (at a predetermined time at a predetermined point), the wireless beacon 82 estimates the azimuth of the own vehicle 80, and the wireless position estimation unit 1 can receive information about the azimuth and, thus, can calculate the amount of movement of the own vehicle 80.

FIGS. 9(a) and 9(b) assume cases where the own vehicle communicates with two wireless beacons (at each point).

FIG. 9 (a) illustrates a situation where the own vehicle 90 travels straight from a point A to a point B beside wireless beacons 92 and 93. At the point A, if a vehicle-side wireless device 91 mounted on the own vehicle 90 receives unidirectional communication from the wireless beacons 92 and 93, this enables calculating the relative positions of the wireless beacons 92 and 93 viewed from the vehicle-side wireless device 91, according to the contents described with reference to FIGS. 3 (a) and 3 (b) (the direction A1 of the wireless beacon 92 viewed from the vehicle-side wireless device 91). Further, with respect to the straight line connecting the two wireless beacons to each other as a reference direction, it is possible to calculate the direction A2 of the vehicle-side wireless device 91 viewed from the wireless beacon 92. Thereafter, at the point B, the directions B1 and B2 and the distance can be similarly detected. In this case, with respect to the direction of the own vehicle 90 at the point A as a reference, the direction of the own vehicle 90 at the point B can be expressed as (A1+B1)−(A2+B2), which has a value close to 0 when the own vehicle 90 travels straight.

FIG. 9(b) illustrates a situation where the own vehicle 90 corners from a point C to a point D beside the wireless beacons 92 and 93. At the point C, if the vehicle-side wireless device 91 mounted on the own vehicle 90 receives unidirectional communication from the wireless beacons 92 and 93, this enables calculating the relative positions of the wireless beacons 92 and 93 viewed from the vehicle-side wireless device 91, according to the contents described with reference to FIGS. 3(a) and 3(b) (the direction C1 of the wireless beacon 92 viewed from the vehicle-side wireless device 91). Further, with respect to the straight line connecting the two wireless beacons to each other as a reference direction, it is possible to calculate the direction C2 of the vehicle-side wireless device 91 viewed from the wireless beacon 92. Thereafter, at the point D, the directions D1 and D2 and the distance can be similarly detected. In this case, with respect to the direction of the own vehicle 90 at the point C as a reference, the direction of the own vehicle 90 at the point D can be expressed as (C1+D1)−(C2+D2), which has a value of about 90 degrees when the own vehicle 90 corners as in FIG. 9(b).

Incidentally, in the examples of FIGS. 9(a) and 9(b), the direction of the own vehicle 90 is calculated by calculating the azimuth with respect to the wireless beacon 92, but the direction of the own vehicle 90 may be also calculated from the azimuth with respect to the wireless beacon 93, or through a method using both the azimuths. Furthermore, it goes without saying that it is also possible to employ a method therefor using communication with three or more wireless beacons.

Thus, in a case where there are two or more wireless beacons with which the own vehicle (the wireless position estimation unit 1 therein) is communicating (at a predetermined time at a predetermined point), the wireless position estimation unit 1 can calculate the relative positions of the respective wireless beacons 92 and 93 and, further, can calculate the amount of movement of the own vehicle 90 using the relative positional relationship between the wireless beacons 92 and 93 (using the straight line connecting the two wireless beacons to each other as a reference direction, in this case).

As described above, by changing the communication method (bidirectional or unidirectional) based on the method for installing the wireless beacon (one wireless beacon or two or more wireless beacons), it is possible to calculate the relative positions of the own vehicle and the wireless beacon in various scenes, which enables calculating the amount of movement of the own vehicle.

Description of Examples of Applications

Next, there will be described examples of utilization of the present invention in actual scenes, with reference to FIGS. 10 and 11.

Figure 10:
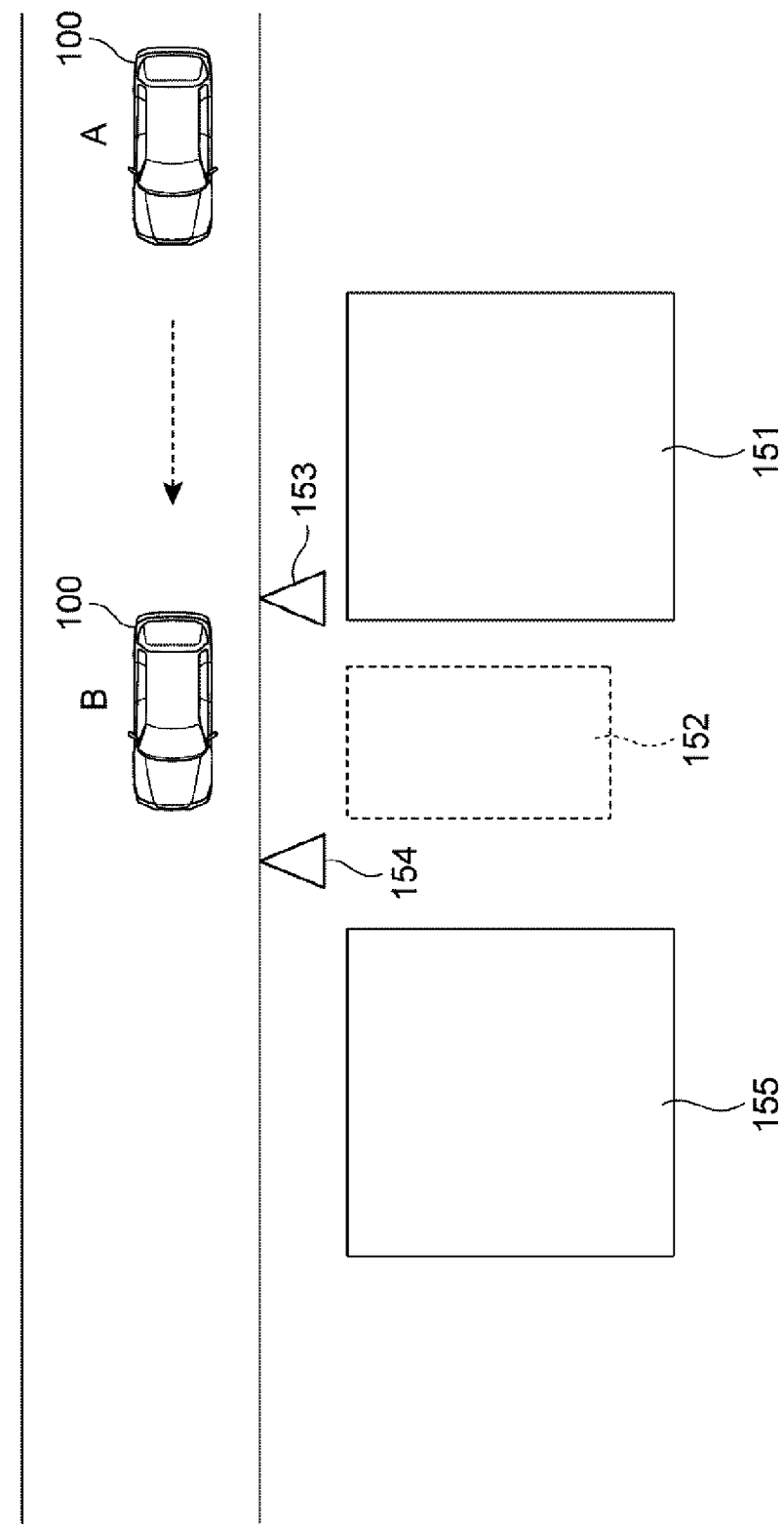
FIG. 10 is a view illustrating an example of an application of the present invention.

FIG. 10 assumes a scene where the own vehicle 100 returns to an own house 151, wherein 152 indicates a vehicle-stop space of the own house 151, 153 and 154 indicate wireless beacons, and 155 indicates a neighboring house.

In FIG. 10, when the own vehicle 100 has reached a point A, a vehicle-side wireless device (not illustrated) mounted on the own vehicle 100 and the wireless beacons 153 and 154 start communicating with each other. Until the own vehicle 100 reaches a point B, the parameters in the vehicle position estimation unit 2 are corrected. Thereafter, in a case where the own vehicle 100 is stopped in the vehicle-stop space 152 through automatic control using the control device 200a, it is possible to improve the vehicle-stoppage accuracy after the completion of the vehicle stoppage, since the own-vehicle position estimation unit 5 is improved in accuracy.

Figure 11:
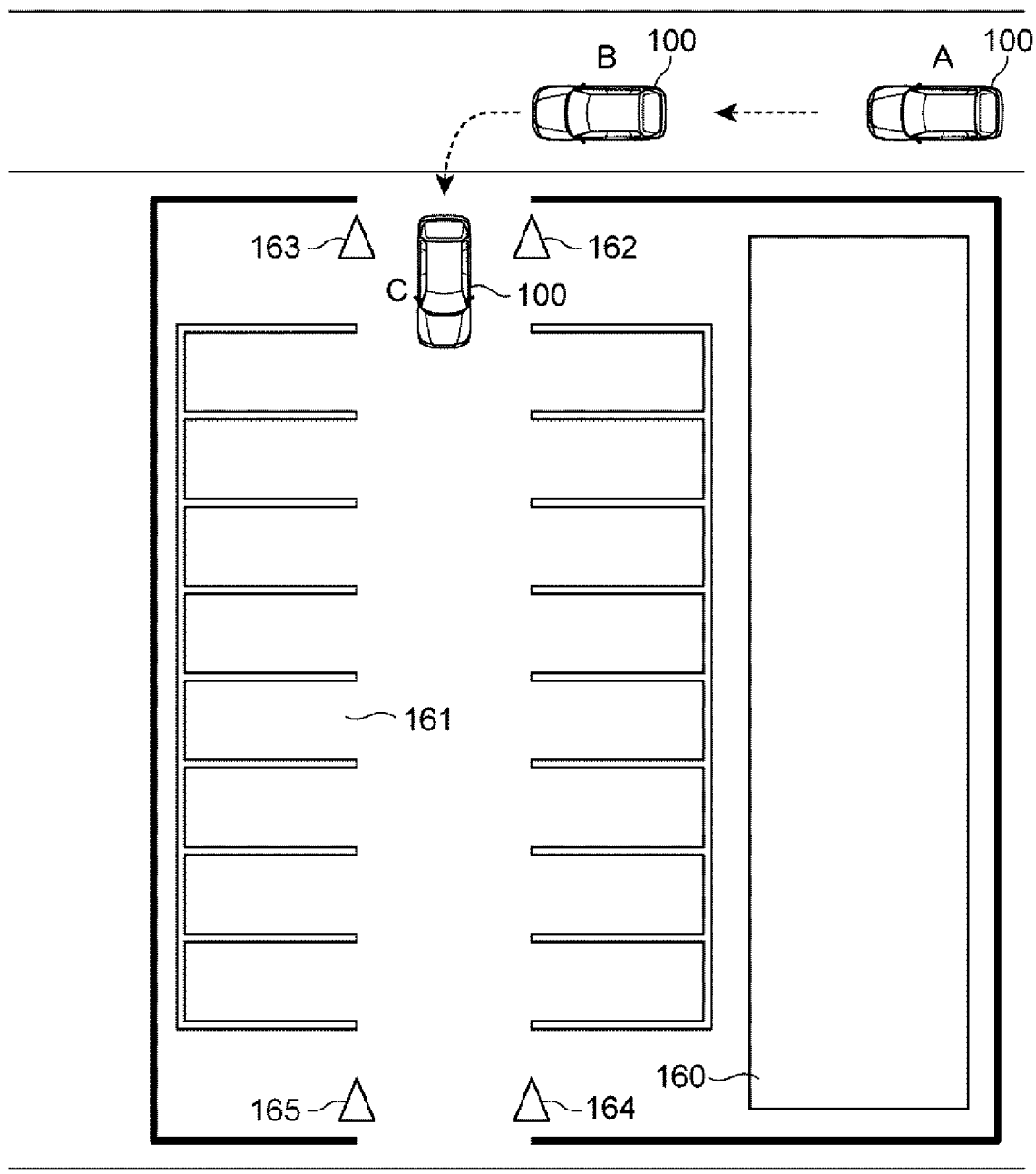
FIG. 11 is a view illustrating another example of an application of the present invention.

FIG. 11 assumes a scene where the own vehicle 100 enters a vehicle-stopping place 161 for using a facility 160, wherein 162,163,164, and 165 indicate wireless beacons.

In FIG. 11, when the own vehicle 100 has reached a point A, the vehicle-side wireless device (not illustrated) mounted on the own vehicle 100 and the wireless beacons 162 and 163 start communicating with each other. Until the own vehicle 100 reaches a point C, the parameters in the vehicle position estimation unit 2 are corrected. In this case, there are a straight-travelling section from the point A to the point B, and a cornering section from the point B to the point C, which enables efficiently correcting the parameters. Thereafter, in a case where the own vehicle 100 is automatically driven within the vehicle-stopping place 161 using the control device 200a and, then, the own vehicle 100 is stopped in a desired vehicle-stopping space through automatic control, it is possible to improve the accuracy during travelling and the vehicle-stoppage accuracy after the completion of the vehicle stoppage, since the own-vehicle position estimation unit 5 is improved in accuracy. Further, it goes without saying that similar operations can be expected in cases where the own vehicle 100 passes between the wireless beacons 164 and 165 as an entering route. Further, when the own vehicle 100 exits the vehicle-stopping place 161, the own vehicle 100 can be caused to communicate with respective wireless beacons, and the parameters in the vehicle position estimation unit 2 can be corrected.

Furthermore, there have been described scenes where wireless beacons installed at specific positions are used. However, in a case where a wireless beacon is installed at an arbitrary position, for example, in the neighboring house 155 in FIG. 10, this wireless beacon can be used. In particular, in a case of implementing the present invention through unidirectional communication with a wireless beacon, it may be considered that there are almost no restrictions on the use thereof.

Further, there have been aforementioned scenes of vehicle-stopping places. However, wireless beacons can be installed at necessary places on a general road or a highway, for example, in order to appropriately ensure the accuracy of the own-vehicle position estimation. This enables expanding the operating ranges of the automatic driving and the advanced driving support.

Further, the vehicle described above includes a moving member which is required to estimate its own position, such as a construction machine, a forklift in a factory, and a robot.

Next, there will be described a method for effectively utilizing a plurality of wireless beacons, with reference to FIG. 12.

Figure 12:
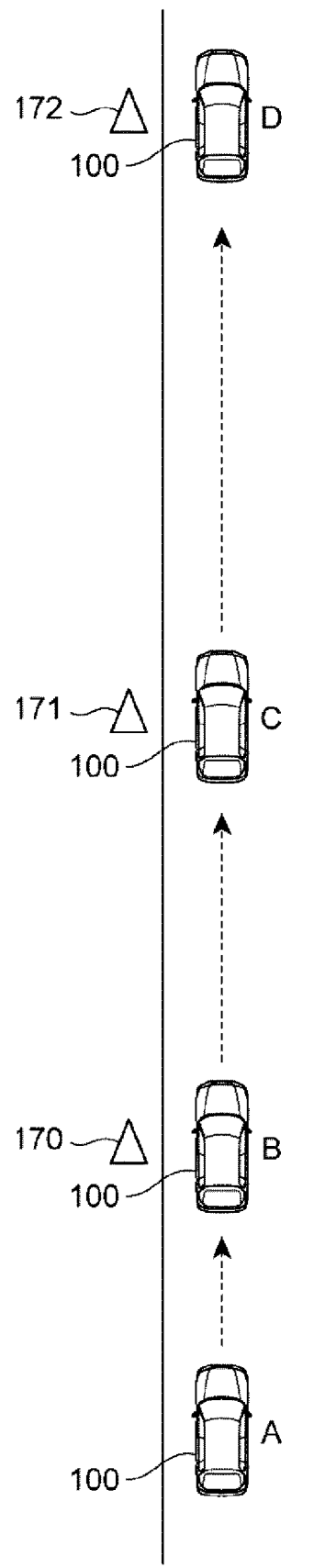
FIG. 12 is a view illustrating an example of a method using a plurality of wireless beacons.

FIG. 12 assumes a scene where the own vehicle 100 passes by wireless beacons 170,171,172.

In FIG. 12, near a point A, the own vehicle 100 starts communicating with the wireless beacon 170. At this time, from the wireless beacon 120, the own vehicle 100 acquires its positional relationship (the distance, the direction, and the like) with the wireless beacon 171. When the own vehicle 100 has reached the vicinity of a point C from a point B, the parameters in the vehicle position estimation unit 2 can be corrected using information about the distance between the wireless beacons 170 and 171. Similarly, if, from the wireless beacon 171 which has started communicating, the own vehicle 100 can acquire its positional relationship (the distance, the direction, and the like) with the wireless beacon 172, similar processing can be performed at a point D at which the own vehicle 100 reaches the wireless beacon 172.

Namely, in a case where the wireless beacons are constituted by a plurality of wireless beacons, and each wireless beacon transmits information about the relative positional relationship with another wireless beacon, the own vehicle 100 (the position estimation parameter correction unit 3 therein) can correct the parameters in the vehicle position estimation unit 2 by calculating the amount of movement of the own vehicle 100 using the information which the wireless position estimation unit 1 has received from each wireless beacon.

DESCRIPTION OF EFFECTS AND ADVANTAGES

As described above, an own-vehicle position estimation device 100a in the present example is an own-vehicle position estimation device 100a including a vehicle position estimation unit 2 for calculating the position of a vehicle based on an output from a sensor for detecting the behavior of the vehicle. The own-vehicle position estimation device 100a further includes a wireless position estimation unit 1 for communicating with a wireless device 101 installed at an arbitrary position and for calculating the relative positions of the vehicle and the wireless device 101, and a position estimation parameter correction unit 3 for correcting parameters used for calculating at least the position of the vehicle and information about the cornering angle of the vehicle by the vehicle position estimation unit 2. The position estimation parameter correction unit 3 compares the amount of movement of the vehicle calculated by the wireless position estimation unit 1 with the amount of movement of the vehicle calculated by the vehicle position estimation unit 2 and corrects the parameters.

Further, an own-vehicle position estimation method in the present example is an own-vehicle position estimation method executed by an own-vehicle position estimation device 100a mounted on a vehicle, in which the own-vehicle position estimation method includes a vehicle position estimation procedure for calculating the position of the vehicle based on an output from a sensor for detecting the behavior of the vehicle, a wireless position estimation procedure for communicating with a wireless device 101 installed at an arbitrary position and for calculating the relative positions of the vehicle and the wireless device 101, and a position estimation parameter correction procedure for correcting parameters used for calculating at least the position of the vehicle and information about the cornering angle of the vehicle by the vehicle position estimation procedure. The position estimation parameter correction procedure includes comparing the amount of movement of the vehicle calculated by the wireless position estimation procedure with the amount of movement of the vehicle calculated by the vehicle position estimation procedure, and correcting the parameters.

Specifically, parameters for dead reckoning are corrected by communicating with a wireless beacon at an arbitrary position and by calculating the amount of relative movement of the own vehicle.

According to the present example, the position of the vehicle and information about the cornering angle of the vehicle can be calculated with high accuracy, which enables estimating the position of the own vehicle, including two-dimensional directions of cornering, only by an internal sensor. Furthermore, it is possible to ensure the accuracy of the own-vehicle position estimation, even in scenes where an external sensor such as a camera or a positioning satellite cannot be used.

Incidentally, the present examples have been described by exemplifying some patterns, but the present invention is also applicable to other patterns. Further, the present invention can be implemented in various aspects without departing from the spirit of the present invention.

Further, the present invention is not limited to the aforementioned examples, and includes various modifications and equivalent structures within the spirit of the appended claims. For example, the aforementioned examples have been described in detail, for the purpose of describing the present invention in such a way as to facilitate understanding the present invention, and the present invention is not necessarily limited to the structure including all the described structures. Further, the structure according to an example may be partially replaced with the structure according to another example. Further, the structure according to an example may be additionally provided with the structure according to another example. Further, the structure according to each example may be partially provided with other structures, eliminated or replaced with other structures.

Further, the aforementioned respective structures, functions, processing units, processing means, and the like may partially or entirely be realized by hardware by, for example, designing them with an integrated circuit, or be realized by software by causing a processor to interpret and execute programs for realizing their respective functions.

Information such as programs, tables and files for realizing the respective functions can be stored in a storage device such as a memory, a hard disk, or a solid state drive (SSD), or a recording medium such as an IC card, an SD card, or a DVD.

Further, there have been illustrated control lines and information lines considered to be necessary for description, and not all control lines and information lines necessary for implementation are illustrated. It may be considered that almost all the structures are connected to each other, in practice.

REFERENCE SIGNS LIST 1 wireless position estimation unit
2 vehicle position estimation unit
3 position estimation parameter correction unit
4 surrounding environment recognition unit
5 own-vehicle position estimation unit
6 map information storage unit
7 travel trajectory creation unit
8 vehicle control unit
9 user setting input unit
10 HMI control unit
101 wireless device (wireless beacon)
102 vehicle-side wireless device
103 external environment recognition device
104 absolute-position measurement device
111 steering device
112 drive device
113 braking device
114 transmission device
115 sound generation device
116 display device
100a own-vehicle position estimation device
200a vehicle control device
30, 80, 90, 100 own vehicle

The invention claimed is:

1. An own-vehicle position estimation device comprising a vehicle position estimation unit for calculating a position of a vehicle based on an output from a sensor for detecting a behavior of the vehicle, the own-vehicle position estimation device further comprising:
a wireless position estimation unit for communicating with a wireless device installed at an arbitrary position and for calculating relative positions of the vehicle and the wireless device; and a position estimation parameter correction unit for correcting a parameter used for calculating at least the position of the vehicle and information about a cornering angle of the vehicle by the vehicle position estimation unit,
wherein the position estimation parameter correction unit compares an amount of movement of the vehicle calculated by the wireless position estimation unit with an amount of movement of the vehicle calculated by the vehicle position estimation unit, and corrects the parameter.

2. The own-vehicle position estimation device according to claim 1, wherein the wireless position estimation unit calculates the relative positions of the vehicle and the wireless device, from azimuth information from a plurality of vehicle-side wireless devices installed in the vehicle and capable of communicating with the wireless device.

3. The own-vehicle position estimation device according to claim 1, wherein the parameter is at least one or more of a distance coefficient for correcting a traveled distance calculated by the vehicle position estimation unit, a cornering coefficient for correcting an amount of cornering, an one-pulse distance coefficient for correcting a wheel speed pulse for the vehicle, a tire diameter coefficient for correcting a tire radius or a tire diameter of the vehicle, a tread length coefficient for correcting a tread length of the vehicle, and a cornering curvature coefficient for correcting a cornering curvature with respect to a steering angle of the vehicle, an one-pulse distance of a wheel speed pulse for the vehicle, a tire radius or a tire diameter of the vehicle, a tread length of the vehicle, and a cornering curvature with respect to a steering angle of the vehicle.

4. The own-vehicle position estimation device according to claim 1, wherein the position estimation parameter correction unit calculates a difference between the amount of movement of the vehicle calculated by the wireless position estimation unit and the amount of movement of the vehicle calculated by the vehicle position estimation unit, and corrects the parameter in such a way as to decrease the difference.

5. The own-vehicle position estimation device according to claim 1, wherein the position estimation parameter correction unit corrects the parameter in such a way as to assign a predetermined weight to the parameter before the correction.

6. The own-vehicle position estimation device according to claim 1, wherein the position estimation parameter correction unit corrects the parameter when a vehicle speed of the vehicle is equal to or lower than a predetermined vehicle speed.

7. The own-vehicle position estimation device according to claim 6, wherein the position estimation parameter correction unit corrects the parameter in such a way as to assign a lager weight to the parameter before the correction as the vehicle speed of the vehicle is lower.

8. The own-vehicle position estimation device according to claim 1, wherein the position estimation parameter correction unit corrects the parameter when the amount of movement of the vehicle calculated by the wireless position estimation unit falls within a predetermined range.

9. The own-vehicle position estimation device according to claim 8, wherein the position estimation parameter correction unit corrects the parameter in such a way as to assign a lager weight to the parameter before correction as the amount of movement of the vehicle which is calculated by the wireless position estimation unit is larger.

10. The own-vehicle position estimation device according to claim 1, wherein the position estimation parameter correction unit stores a difference between the amount of movement of the vehicle calculated by the wireless position estimation unit and the amount of movement of the vehicle calculated by the vehicle position estimation unit and/or an amount of correction of the parameter, and when the difference and/or the amount of correction of the parameter has been stored more than a predetermined number of times, the position estimation parameter correction unit corrects the parameter based on the predetermined number of times of the differences and/or the amounts of correction of the parameter.

11. The own-vehicle position estimation device according to claim 1, wherein, when there is one wireless device with which the wireless position estimation unit is communicating, the wireless device estimates an azimuth of the vehicle, and the wireless position estimation unit receives information about the azimuth and calculates the amount of movement of the vehicle.

12. The own-vehicle position estimation device according to claim 1, wherein, when there are two or more wireless devices with which the wireless position estimation unit is communicating, the wireless position estimation unit calculates relative positions of the respective wireless devices and calculates the amount of movement of the vehicle using a relative positional relationship between the wireless devices.

13. The own-vehicle position estimation device according to claim 1, wherein the wireless device is constituted by a plurality of wireless devices, and each wireless device transmits information about its relative positional relationship with another wireless device, and the position estimation parameter correction unit corrects the parameter by calculating the amount of movement of the vehicle using the information which the wireless position estimation unit has received from the each wireless device.

14. The own-vehicle position estimation device according to claim 1, wherein
the position estimation parameter correction unit does not correct the parameter when a difference between the parameter before correction and the parameter after correction is equal to or more than a predetermined value, and
when the position estimation parameter correction unit does not correct the parameter since the difference between the parameter before correction and the parameter after correction is equal to or more than the predetermined value, the position estimation parameter correction unit notifies an occupant of the vehicle of information indicating that the parameter is not corrected.

15. An own-vehicle position estimation method executed by an own-vehicle position estimation device mounted in a vehicle, the own-vehicle position estimation method comprising:
a vehicle position estimation procedure for calculating a position of the vehicle based on an output from a sensor for detecting a behavior of the vehicle; a wireless position estimation procedure for communicating with a wireless device installed at an arbitrary position and for calculating relative positions of the vehicle and the wireless device; and a position estimation parameter correction procedure for correcting a parameter used for calculating at least the position of the vehicle and information about a cornering angle of the vehicle by the vehicle position estimation procedure,
wherein the position estimation parameter correction procedure includes comparing an amount of movement of the vehicle calculated by the wireless position estimation procedure with an amount of movement of the vehicle calculated by the vehicle position estimation procedure, and correcting the parameter.

* * * * *